(12) United States Patent
Ferron et al.

(10) Patent No.: US 7,569,193 B2
(45) Date of Patent: *Aug. 4, 2009

(54) APPARATUS AND METHOD FOR CONTROLLED COMBUSTION OF GASEOUS POLLUTANTS

(75) Inventors: Shawn Ferron, Martinez, CA (US); John Kelly, Saratoga, CA (US); Robbert Vermeulen, Pleasant Hill, CA (US)

(73) Assignee: Applied Materials, Inc., Santa Clara, CA (US)

( * ) Notice: Subject to any disclaimer, the term of this patent is extended or adjusted under 35 U.S.C. 154(b) by 718 days.

This patent is subject to a terminal disclaimer.

(21) Appl. No.: 10/742,126

(22) Filed: Dec. 19, 2003

(65) Prior Publication Data

US 2005/0135984 A1 Jun. 23, 2005

(51) Int. Cl.
*B01D 50/00* (2006.01)
(52) U.S. Cl. .................................... 422/168
(58) Field of Classification Search ............ 422/168, 422/171, 173; 96/270, 275; 423/210
See application file for complete search history.

(56) References Cited

U.S. PATENT DOCUMENTS

| | | |
|---|---|---|
| 2,819,151 A | 1/1958 | Flemmert |
| 3,185,846 A | 5/1965 | Gilbert et al. |
| 3,203,759 A | 8/1965 | Flemmert |
| 3,276,506 A | 10/1966 | Micko |
| 3,698,696 A | 10/1972 | Rauskolb |
| 3,813,852 A | 6/1974 | Steineke |
| 3,845,191 A | 10/1974 | Bruce et al. |
| 3,898,040 A | 8/1975 | Tabak |
| 3,949,057 A | 4/1976 | Gilbert, Jr. |

(Continued)

FOREIGN PATENT DOCUMENTS

DE 0215706 A1 11/1984

(Continued)

OTHER PUBLICATIONS

9984/PCT/EPC (App. No. 04814510.6) Search Report dated Jan. 5, 2009.

(Continued)

*Primary Examiner*—Tom Duong
(74) *Attorney, Agent, or Firm*—Dugan & Dugan, P.C.

(57) ABSTRACT

The present invention relates to systems and methods for controlled combustion of gaseous pollutants while reducing and removing deposition of unwanted reaction products from within the treatment systems. The systems employ a two-stage thermal reactor having an upper thermal reactor including at least one inlet for mixing a gaseous waste stream with oxidants and combustible fuels for thermal combustion within the upper thermal reactor. The upper thermal reactor further includes a double wall structure having an outer exterior wall and an interior porous wall that defines an interior space for holding a fluid and ejecting same, in a pulsating mode, through the interior porous wall into the upper thermal reactor to reduce deposition of the reaction products on the interior of the upper reactor chamber. The two-stage thermal reactor further includes a lower reactor chamber for flowing reaction products formed in the upper thermal reactor through a water vortex that provides a water overflow along the interior of the lower reactor chamber thereby reducing deposition of unwanted products on the interior surface of the lower reactor.

30 Claims, 3 Drawing Sheets

U.S. PATENT DOCUMENTS

| | | |
|---|---|---|
| 3,969,482 A | 7/1976 | Teller |
| 3,969,485 A | 7/1976 | Flemmert |
| 3,983,021 A | 9/1976 | Henis |
| 4,011,298 A | 3/1977 | Fukui et al. |
| 4,059,386 A | 11/1977 | Eising |
| 4,083,607 A | 4/1978 | Mott |
| 4,154,141 A | 5/1979 | Sayles |
| 4,172,708 A | 10/1979 | Wu et al. |
| 4,206,189 A | 6/1980 | Kosintsev et al. |
| 4,236,464 A | 12/1980 | Anderson et al. |
| 4,238,460 A | 12/1980 | Aiken et al. |
| 4,243,372 A | 1/1981 | Cade |
| 4,296,079 A | 10/1981 | Hauser |
| 4,374,649 A | 2/1983 | Rao |
| 4,392,821 A | 7/1983 | Füssl et al. |
| 4,479,443 A | 10/1984 | Faldt et al. |
| 4,479,809 A | 10/1984 | Johnson et al. |
| 4,483,672 A | 11/1984 | Wallace et al. |
| 4,519,999 A | 5/1985 | Coleman et al. |
| 4,541,995 A | 9/1985 | Kim et al. |
| 4,555,389 A | 11/1985 | Soneta et al. |
| 4,584,001 A | 4/1986 | Dechene |
| 4,644,877 A | 2/1987 | Barton et al. |
| 4,661,056 A | 4/1987 | Vickery et al. |
| 4,719,088 A | 1/1988 | Itoh et al. |
| 4,753,915 A | 6/1988 | Vogt et al. |
| 4,788,036 A | 11/1988 | Eiselstein et al. |
| 4,801,437 A | 1/1989 | Konagaya et al. |
| 4,834,020 A | 5/1989 | Bartholomew |
| 4,886,444 A | 12/1989 | Hirase et al. |
| 4,908,191 A | 3/1990 | Boldish et al. |
| 4,935,212 A | 6/1990 | Jacob |
| 4,954,320 A | 9/1990 | Birmingham et al. |
| 4,966,611 A | 10/1990 | Schumacher et al. |
| 4,975,098 A | 12/1990 | Lee et al. |
| 4,981,722 A | 1/1991 | Moller et al. |
| 4,986,838 A | 1/1991 | Johnsgard |
| 4,993,358 A | 2/1991 | Mahawili |
| 5,000,221 A | 3/1991 | Palmer |
| 5,009,869 A | 4/1991 | Weinberg et al. |
| 5,011,520 A | 4/1991 | Carr et al. |
| 5,045,288 A | 9/1991 | Raupp et al. |
| 5,077,525 A | 12/1991 | West et al. |
| 5,113,789 A | 5/1992 | Kamian |
| 5,114,683 A | 5/1992 | Hirase |
| 5,118,286 A | 6/1992 | Sarin |
| 5,122,391 A | 6/1992 | Mayer |
| 5,123,836 A | 6/1992 | Yoneda et al. |
| 5,136,975 A | 8/1992 | Bartholomew et al. |
| 5,137,701 A | 8/1992 | Mundt |
| 5,147,421 A | 9/1992 | Yung |
| 5,151,116 A | 9/1992 | Scholz et al. |
| 5,154,237 A | 10/1992 | Cooper |
| 5,160,707 A | 11/1992 | Murray et al. |
| 5,176,897 A | 1/1993 | Lester |
| 5,183,646 A | 2/1993 | Anderson et al. |
| 5,199,856 A | 4/1993 | Epstein et al. |
| 5,206,003 A | 4/1993 | Imoto et al. |
| 5,207,836 A | 5/1993 | Chang |
| 5,211,729 A | 5/1993 | Sherman |
| 5,213,767 A | 5/1993 | Smith et al. |
| 5,220,940 A | 6/1993 | Palmer |
| 5,238,656 A | 8/1993 | Tajima et al. |
| 5,251,654 A | 10/1993 | Palmer |
| 5,252,007 A | 10/1993 | Klinzing et al. |
| 5,255,709 A | 10/1993 | Palmer |
| 5,255,710 A | 10/1993 | Palmer |
| 5,271,908 A | 12/1993 | Shiban et al. |
| 5,280,664 A | 1/1994 | Lin |
| 5,281,302 A | 1/1994 | Gabric et al. |
| 5,292,704 A | 3/1994 | Lester |
| 5,304,398 A | 4/1994 | Krusell et al. |
| 5,320,124 A | 6/1994 | Palmer |
| 5,361,800 A | 11/1994 | Ewing |
| 5,364,604 A | 11/1994 | Spink et al. |
| 5,393,394 A | 2/1995 | Ikeda et al. |
| 5,407,647 A | 4/1995 | Tarancon |
| 5,417,934 A | 5/1995 | Smith et al. |
| 5,425,886 A | 6/1995 | Smith |
| 5,439,568 A | 8/1995 | Uchiyama |
| 5,450,873 A | 9/1995 | Palmer |
| 5,453,125 A | 9/1995 | Krogh |
| 5,453,494 A | 9/1995 | Kirlin et al. |
| 5,456,280 A | 10/1995 | Palmer et al. |
| 5,494,004 A | 2/1996 | Hunter, Jr. |
| 5,495,893 A | 3/1996 | Roberts et al. |
| 5,510,066 A | 4/1996 | Fink et al. |
| 5,510,093 A | 4/1996 | Bartz et al. |
| 5,527,631 A | 6/1996 | Singh et al. |
| 5,533,890 A | 7/1996 | Holst et al. |
| 5,572,866 A | 11/1996 | Loving |
| 5,575,636 A | 11/1996 | Kobayashi et al. |
| 5,584,959 A | 12/1996 | Kimura et al. |
| 5,589,148 A | 12/1996 | Otsuka et al. |
| 5,597,540 A | 1/1997 | Akita et al. |
| 5,599,508 A | 2/1997 | Martinelli et al. |
| 5,601,790 A | 2/1997 | Stilger et al. |
| 5,603,905 A | 2/1997 | Bartz et al. |
| 5,643,545 A | 7/1997 | Chen et al. |
| 5,649,985 A * | 7/1997 | Imamura ..................... 96/275 |
| 5,650,128 A | 7/1997 | Holst et al. |
| 5,663,476 A | 9/1997 | Cripe et al. |
| 5,665,317 A | 9/1997 | Laslo |
| 5,693,293 A | 12/1997 | Reichardt et al. |
| 5,702,999 A | 12/1997 | Mazanec et al. |
| H1701 H | 1/1998 | DePinto et al. |
| 5,716,428 A | 2/1998 | Imamura |
| 5,720,444 A | 2/1998 | Wheeler et al. |
| 5,720,931 A | 2/1998 | Rossin et al. |
| 5,749,720 A | 5/1998 | Fukuda et al. |
| 5,756,052 A | 5/1998 | Suzumura et al. |
| 5,759,237 A | 6/1998 | Li et al. |
| 5,759,498 A | 6/1998 | Sheu et al. |
| 5,762,893 A | 6/1998 | Scholz et al. |
| 5,779,863 A | 7/1998 | Ha et al. |
| 5,779,998 A | 7/1998 | Tom |
| 5,785,741 A | 7/1998 | Li et al. |
| 5,788,778 A | 8/1998 | Shang et al. |
| 5,790,934 A | 8/1998 | Say et al. |
| 5,800,792 A | 9/1998 | Ibaraki et al. |
| 5,817,284 A | 10/1998 | Nakano et al. |
| 5,833,888 A | 11/1998 | Arya et al. |
| 5,840,897 A | 11/1998 | Kirlin et al. |
| 5,843,239 A | 12/1998 | Shrotriya |
| 5,843,288 A | 12/1998 | Yamamoto |
| 5,855,648 A | 1/1999 | Prasad et al. |
| 5,855,822 A | 1/1999 | Chen |
| 5,858,065 A | 1/1999 | Li et al. |
| 5,865,879 A | 2/1999 | Lee |
| 5,877,391 A | 3/1999 | Kanno et al. |
| 5,891,404 A | 4/1999 | Ibaraki et al. |
| 5,900,217 A | 5/1999 | Hartung et al. |
| 5,914,091 A | 6/1999 | Holst et al. |
| 5,919,285 A | 7/1999 | Li et al. |
| 5,935,283 A | 8/1999 | Sweeney et al. |
| 5,935,540 A | 8/1999 | Otsuka et al. |
| 5,938,422 A | 8/1999 | Smith et al. |
| 5,955,037 A | 9/1999 | Holst et al. |
| 5,957,678 A | 9/1999 | Endoh et al. |
| 5,965,786 A | 10/1999 | Rostaing et al. |
| 5,972,078 A | 10/1999 | Collins et al. |
| 5,989,412 A | 11/1999 | Okagami et al. |
| 6,007,742 A | 12/1999 | Czernichowski et al. |
| 6,009,827 A | 1/2000 | Robles et al. |

| | | | | | | |
|---|---|---|---|---|---|---|
| 6,010,576 | A | 1/2000 | Lin | EP | 0 802 370 A2 | 10/1997 |
| 6,013,584 | A | 1/2000 | M'saad et al. | EP | 0 809 071 A1 | 11/1997 |
| 6,030,591 | A | 2/2000 | Tom et al. | EP | 0 861 683 A2 | 9/1998 |
| 6,059,858 | A | 5/2000 | Lin et al. | EP | 0 885 648 A1 | 12/1998 |
| 6,072,227 | A | 6/2000 | Yau et al. | EP | 0 916 388 A2 | 5/1999 |
| 6,095,084 | A | 8/2000 | Shamouilian et al. | EP | 0 919 773 A1 | 6/1999 |
| 6,110,529 | A | 8/2000 | Gardiner et al. | EP | 0 933 120 A1 | 8/1999 |
| 6,153,150 | A | 11/2000 | Moore et al. | EP | 1 129 775 A1 | 9/2001 |
| 6,153,159 | A | 11/2000 | Engeler et al. | EP | 1 143 197 A1 | 10/2001 |
| 6,185,839 | B1 | 2/2001 | Kholodenko et al. | EP | 1 240 937 A1 | 9/2002 |
| 6,187,072 | B1 | 2/2001 | Cheung et al. | EP | 1 431 657 A1 | 6/2004 |
| 6,187,080 | B1 * | 2/2001 | Ping-Chung et al. ......... 96/273 | FR | 2 062 565 | 6/1971 |
| 6,190,507 | B1 | 2/2001 | Whealton et al. | GB | 2 028 998 A | 3/1980 |
| 6,217,640 | B1 | 4/2001 | Lu et al. | JP | 51-129868 | 11/1976 |
| 6,234,787 | B1 | 5/2001 | Endoh et al. | JP | 57-091725 | 6/1982 |
| 6,261,524 | B1 * | 7/2001 | Herman et al. .............. 422/173 | JP | 57-117333 | 7/1982 |
| 6,322,756 | B1 * | 11/2001 | Arno et al. ................. 422/171 | JP | 58-045718 | 3/1983 |
| 6,338,312 | B2 | 1/2002 | Hayes et al. | JP | 59-082927 | 5/1984 |
| 6,345,768 | B1 | 2/2002 | Inagaki et al. | JP | 61-021717 | 1/1986 |
| 6,361,584 | B1 | 3/2002 | Stevens et al. | JP | 61-200851 | 9/1986 |
| 6,423,284 | B1 | 7/2002 | Arno et al. | JP | 62-273039 | 11/1987 |
| 6,464,944 | B1 | 10/2002 | Moore et al. | JP | 63-062528 | 3/1988 |
| 6,468,490 | B1 | 10/2002 | Shamouilian et al. | JP | 02-068414 | 3/1990 |
| 6,491,884 | B1 | 12/2002 | Faller et al. | JP | 02-102719 | 4/1990 |
| 6,511,641 | B2 * | 1/2003 | Herman et al. .............. 423/210 | JP | 02 225905 A | 9/1990 |
| 6,527,828 | B2 | 3/2003 | Flippo et al. | JP | 3-9768 | 2/1991 |
| 6,544,482 | B1 | 4/2003 | Inori | JP | 03-047516 | 2/1991 |
| 6,655,137 | B1 | 12/2003 | Sardari | JP | 91009768 | 2/1991 |
| 6,712,603 | B2 | 3/2004 | Pettit | JP | 03-065218 | 3/1991 |
| 6,805,728 | B2 | 10/2004 | Sweeney et al. | JP | 03-262523 | 11/1991 |
| 6,813,943 | B2 | 11/2004 | Smith et al. | JP | 04-050422 | 2/1992 |
| 6,824,748 | B2 | 11/2004 | Kaushal et al. | JP | 04-209524 | 10/1992 |
| 6,843,830 | B2 | 1/2005 | Sherer | JP | 05-192534 | 8/1993 |
| 6,875,007 | B2 | 4/2005 | Pettit | JP | 05-296979 | 11/1993 |
| 6,946,107 | B2 | 9/2005 | Carlborg et al. | JP | 06-063357 | 3/1994 |
| 6,969,250 | B1 | 11/2005 | Kawamura et al. | JP | 06-137537 | 5/1994 |
| 7,047,893 | B2 | 5/2006 | Loving | JP | 06 313532 A | 11/1994 |
| 7,160,521 | B2 | 1/2007 | Porshnev et al. | JP | 07-010335 | 1/1995 |
| 7,316,721 | B1 | 1/2008 | Redden et al. | JP | 07-323211 | 12/1995 |
| 2001/0001652 | A1 | 5/2001 | Kanno et al. | JP | 08-309146 | 11/1996 |
| 2001/0032543 | A1 | 10/2001 | Seeley et al. | JP | 08-333453 | 12/1996 |
| 2001/0055555 | A1 | 12/2001 | Herman et al. | JP | 09 133333 A | 5/1997 |
| 2002/0066535 | A1 | 6/2002 | Brown et al. | JP | 10-192653 | 7/1998 |
| 2002/0110500 | A1 | 8/2002 | Moore et al. | JP | 11-070322 | 3/1999 |
| 2002/0159924 | A1 | 10/2002 | Arno et al. | JP | 11-276860 | 10/1999 |
| 2002/0182131 | A1 | 12/2002 | Kaushal et al. | JP | 11-319485 | 11/1999 |
| 2004/0065013 | A1 | 4/2004 | DeVries | JP | 11-335164 | 12/1999 |
| 2004/0161718 | A1 | 8/2004 | Pettit | JP | 2000-108245 | 4/2000 |
| 2004/0191146 | A1 | 9/2004 | Shinohara et al. | JP | 2001-082723 | 3/2001 |
| 2004/0213721 | A1 | 10/2004 | Arno et al. | JP | 2001082723 A | 3/2001 |
| 2004/0216610 | A1 | 11/2004 | Tom et al. | KR | 1999-007143 | 1/1999 |
| 2004/0237781 | A1 | 12/2004 | Terada et al. | WO | WO 96/16720 A1 | 6/1996 |
| 2006/0024226 | A1 | 2/2006 | Park et al. | WO | WO9749479 | 12/1997 |
| 2006/0104879 | A1 | 5/2006 | Chiu et al. | WO | WO 98/29181 A1 | 7/1998 |
| 2007/0169889 | A1 | 7/2007 | Clark et al. | WO | WO 99/02921 A1 | 1/1999 |
| 2007/0172398 | A1 | 7/2007 | Clark et al. | WO | WO 99/61132 A1 | 2/1999 |
| 2007/0172399 | A1 | 7/2007 | Clark et al. | WO | WO 00/09258 A1 | 2/2000 |
| 2007/0190469 | A1 | 8/2007 | Clark et al. | WO | WO 00/67879 A1 | 11/2000 |
| 2007/0274876 | A1 | 11/2007 | Chiu et al. | WO | WO 01/78873 A1 | 10/2001 |
| 2009/0010816 | A1 | 1/2009 | Ferron et al. | WO | WO 2004/031073 A2 | 4/2004 |
| | | | | WO | W 2005/062772 | 7/2005 |
| | | | | WO | WO 2006/053231 | 11/2006 |
| | | | | WO | WO 2007/053626 | 12/2007 |

FOREIGN PATENT DOCUMENTS

| | | |
|---|---|---|
| DE | 4311061 A1 | 10/1994 |
| DE | 4319118 A1 | 12/1994 |
| DE | 4321762 A1 | 1/1995 |
| DE | 19526737 | 1/1997 |
| EP | 0306540 A1 | 3/1989 |
| EP | 0 360 941 A2 | 4/1990 |
| EP | 0 412 456 A2 | 2/1991 |
| EP | 0 597 393 A1 | 5/1994 |
| EP | 0642809 A1 | 3/1995 |
| EP | 0 694 735 A1 | 1/1996 |

OTHER PUBLICATIONS

Office Action of Chinese Patent Application No. 2004S0038033.X (9984/PCT/CHI) dated Jul. 25, 2008.
ISR & WrO dated Nov. 16, 2006 [PCT/US2004/042334 (9984/PCT)].
Office Action of Malaysia Patent Application No. PI 20045188 (9984/PCT/MAYS) dated Apr. 18, 2008.

Abreu, et al. Causes of anomalous solid formation in the exhaust system of low-pressure chemical vapor deposition plasma enhanced chemical vapor deposition semiconductor processes, J. Vac. Sci. Technol B 12(4) Jul./Aug. 1994, pp. 2763-2767.

Cady, George Hamilton, "Reaction of Fluorine with Water and with Hydroxides", Feb.1935, J. J. Am. Chem. Soc., vol. 57, pp. 246-249.

Catalytic Decomposition System, Hitachi America, Ltd. Semiconductor Equipment Group-SCDS Gas Abatement Systems, <http://www.hitachi.com/semiequipment/productsscds.html>, pp. 1-2, printed on Apr. 21, 1999.

Environmental—Complete system solutions for air pollution control (Brochure—<http://www.olpidurr.com/e/images/environmental2001.pdf>), Dürr Environmental, Inc. <http://www.olpidurr.com/e/eco/ecopage.htm>, p. 1-12.

Fenwal Test Detonation Arresting System at NMERI Site, May 1992 test of Fenwal Detonation Arresting System at New Mexico Engineering Research Institute.

Hardwick, Steven J., et al., "Waste Minimization in Semiconductor Processing", 1994, Mater. Res. Soc. Symp. Proc., vol. 344, pp. 273-278.

Hayakawa, Saburo, "Silane Gas Scrubber", Koatsu Gasu, 24(7), p. 371-9, (1987).

Holmes, John T., et al., "Fluidized Bed Disposal of Fluorine", Oct. 1967, I&EC Process Design and Development, vol. 6, No. 4, pp. 408-413.

Kanken Techno detoxifier KT 1000 Venus, Crystec Technology Trading GmbH, <http://www.crystec.com/ktcvenue.htm>, pp. 1-4, printed on Jul. 27, 1999.

Landau, Ralph, et al., "Industrial handling of Flourine", Mar. 1947, Industrial and Engineering Chemistry, vol. 39, No. 3, pp. 281-286.

Langan, John., et al., "Strategies for greenhouse gas reduction", Jul. 1996, Solid State Technology, pp. 115-119.

M. Brinkmann et al., "Unsteady State Treatment of Very Lean Waste Gases in a Network of Catalytic Burners", 1999, Elsevier Science B. V.—Catalysis Today 47, pp. 263-277.

Slabey, Vernon A., et al., "Rate of Reaction of Gaseous Fluorine with Water Vapor at 35° C.", (1958), National Advisory Committee for Aeronautics, Technical Note 4374, pp. 1-16.

Smiley, et al. "Continuous Disposal of Fluorine", Industrial and Engineering Chemistry, 1954, vol. 46, No. 2, pp. 244-247.

Streng, A. G., "The Fluorine-Steam Flame and Its Characteristics", Jun. 1962, Combustion Flame, vol. 6, pp. 89-91.

Turnbull, S. G., et al., "Analysis and Disposal of Fluorine", Industrial and Engineering Chemistry, Mar. 1947, vol. 39, No. 3, pp. 286-288.

* cited by examiner

APPARATUS AND METHOD FOR CONTROLLED COMBUSTION OF GASEOUS POLLUTANTS

BACKGROUND OF THE INVENTION

1. Field of the Invention

The present invention relates to systems and methods for thermal treatment of industrial effluent fluids such as effluent gases produced in semiconductor manufacturing while reducing deposition of reaction products in the treatment systems.

2. Description of the Related Art

The gaseous effluents from the manufacturing of semiconductor materials, devices, products and memory articles involve a wide variety of chemical compounds used and produced in the process facility. These compounds include inorganic and organic compounds, breakdown products of photoresist and other reagents, and a wide variety of other gases that must be removed from the gaseous waste streams before being vented from the process facility into the atmosphere.

Semiconductor manufacturing processes utilize a variety of chemicals, many of which have extremely low human tolerance levels. Such materials include gaseous hydrides of antimony, arsenic, boron, germanium, nitrogen, phosphorous, silicon, selenium; silane; silane mixtures with phosphine, argon, hydrogen; organosilanes, halosilanes, halogens and other organic compounds.

Halogens, e.g., fluorine ($F_2$) and fluorinated compounds are particularly problematic among the various components requiring abatement. The electronics industry uses perfluorinated compounds (PFCs) in wafer processing tools to remove residue from deposition steps and to etch thin films. PFCs are recognized to be strong contributors to global warming and the electronics industry is working to reduce the emissions of these gases. The most commonly used PFCs include $CF_4$, $C_2F_6$, $SF_6$, $C_3F_8$, and $NF_3$. These PFCs are dissociated in a plasma to generate highly reactive $F_2$ and fluorine radicals, which do the actual cleaning, and etching. The products from these processing operations include mostly fluorine, silicon tetrafluoride ($SiF_4$), and to a lesser extent hydrogen fluoride (HF), carbonyl fluoride ($COF_2$), $CF_4$ and $C_2F_6$.

A significant problem has been the removal of these materials from effluent gas streams of semiconductor manufacturing processes. While virtually all U.S. semiconductor-manufacturing facilities utilize scrubbers or similar means for treatment of their effluent gases, the technology employed in these facilities is not capable of removing all toxic or otherwise unacceptable impurities.

One solution to this problem is to incinerate the process gas to oxidize the toxic materials, converting them to less toxic forms. Such systems are almost always over-designed in terms of its treatment capacity, and typically do not have the ability to safely deal with a large number of mixed chemistry streams without posing complex reactive chemical risks. Further, conventional incinerators typically achieve less than complete combustion thereby allowing the release of pollutants to the atmosphere including carbon monoxide (CO) and hydrocarbons (HC). Furthermore, one of the problems of great concern in gas effluents is the formation of acid mist, acid vapors, acid gases and NOx (NO, $NO_2$). A further limitation of conventional incinerators is their inability to mix sufficient combustible fuel with a nonflammable process stream in order to render the resultant mixture flammable and completely combustible.

Oxygen or oxygen enriched air may be added directly into the combustion chamber for mixing with the gaseous waste streams to increase combustion temperatures, however, oxides, particularly silicon oxides may be formed and these oxides tend to deposit on the walls of the combustion chamber. The mass of silicon oxides formed can be relatively large and the gradual deposition within the combustion chamber can necessitate increased maintenance of the equipment.

Accordingly, it would be advantageous to provide an improved thermal reactor unit for the combustion of highly resistant contaminates in a gaseous waste stream that provides for high combustion temperatures through the introduction of highly flammable gases for mixing with the gaseous waste stream to insure complete combustion while reducing deposition of unwanted reaction products within the thermal reaction unit.

SUMMARY OF INVENTION

The present invention relates to methods and systems for providing controlled combustion of gaseous semiconductor wastes in a thermal reactor while reducing accumulation of deposition products within the system.

In one aspect, the present invention relates to a two-stage reactor for removing pollutants from gaseous waste streams, the two-stage reactor comprising:
a) an upper thermal reaction chamber comprising:
  i) an outer exterior wall;
  ii) an interior porous wall, wherein the interior porous wall defines a central combustion chamber, and wherein the interior porous wall is positioned from the outer exterior wall a sufficient distance to define an interior space;
  iii) at least one waste gas inlet in fluid communication with the central combustion chamber for introducing a gaseous waste stream therein;
  iv) thermal means for combusting the gaseous waste stream, thereby forming reaction products;
  v) means for introducing a fluid under pulsing conditions into the interior space, wherein the interior porous wall provides for transference of the fluid from the interior space into the central combustion chamber at a sufficient force to reduce deposition of reaction products on the interior porous wall;
b) a lower reaction chamber comprising:
  i) a gas flow chamber in fluid communication with the central combustion chamber comprising an inlet and outlet for passing the gaseous waste stream and reaction products therethrough;
  ii) at least one oxidant inlet positioned to introduce an oxidant to the gas stream flow chamber; and
  iii) a liquid vortex positioned near the inlet of the gas flow chamber, wherein the liquid vortex comprises means for generating a downwardly flowing liquid film on interior surfaces of the gas stream flow chamber thereby reducing deposition and accumulation of particulate solids thereon.

In yet another aspect, the present invention relates to a system for controlled combustion of gaseous pollutants in a gaseous waste stream, the system comprising:
a) an upper thermal reaction chamber comprising:
  i) an outer exterior wall;
  ii) an interior porous wall, wherein the interior porous wall defines a central combustion chamber and wherein the interior porous wall is positioned from the outer exterior wall a sufficient distance to define an interior annular space;
  iii) means for introducing a fluid under pulsing conditions to the interior annular space, wherein the interior porous wall provides for transference of the fluid from the interior annular space; into the central combustion chamber at sufficient pressure or velocity to reduce deposition of reaction products on the interior porous wall;

vi) thermal means for combusting the gaseous waste stream, thereby forming reaction products;

v) at least one waste gas inlet for conducting the gaseous waste stream into the upper thermal reactor, the waste gas inlet comprising a conduit terminating with a portion of the conduit within the central combustion chamber wherein the portion of the conduit is located within a tube which projects beyond the end of the conduit to define a chamber within the tube for flame formation, the tube having an open end communicating with the central combustion chamber;

a lower reaction chamber comprising:

i) a gas flow chamber in fluid communication with the central combustion chamber;

ii) at least one oxidant inlet positioned to introduce an oxidant to the gas stream flow chamber; and iii) a liquid vortex positioned between the central combustion chamber and the gas stream flow chamber, wherein the liquid vortex comprises means for generating a downwardly flowing liquid film on interior surfaces of the gas stream flow chamber thereby reducing deposition and accumulation of particulate solids thereon.

Preferably, the liquid vortex comprises:

(i) an outer shell having a top plate, a central opening in fluid communication with the central combustion chamber;

(ii) a conical-shaped baffle within the outer shell having an inner surface and a central opening which is generally aligned with the interior surface of the gas stream flow chamber, the conical-shaped baffle generally concentrically aligned with the inner surface of the outer shell to form a concentric chamber; and (iii) a liquid inlet arranged to tangentially introduce liquid into the concentric chamber, thereby filling the concentric chamber with liquid to create a swirling motion, causing the liquid to rise and overflow the conical-shaped baffle into the gas stream flow chamber to form a laminar sheet of fluid on the inner surface of the conical-shaped baffle that flows downwardly onto the interior surface of the gas stream flow chamber.

By such arrangement, the gas stream entering the gas stream flow chamber is prevented from directly contacting the walls in the lower portion of the structure. The falling film of water from the "vortex" resists particulate solids accumulating on the interior wall surfaces of the gas stream flow chamber. The motive liquid stream on such wall surfaces carries the particulates in the gas stream contacting the water film, downwardly for discharge from the gas stream flow chamber.

In the upper reaction chamber, the interior porous wall may comprise a sintered ceramic body, a sintered metal or any material having fine pores throughout the material for transference of fluid therethrough regardless of the pore size or mesh size. Preferably, the pores are uniformly distributed throughout the material. The material may include pores or perforations of a size to permit fluids to be easily ejected through the interior wall to the combustion chamber at a sufficient velocity to reduce movement of reaction products towards the interior surface of the combustion chamber. For example, there may be on the order of 40 to 1400 perforations per square inch having a diameter that is determined by the number of perforations.

In the alternative, interior porous wall may comprise a material comprising a plurality of tapered protuberances having a generally funnel-like configuration, which narrow in the direction of the combustion chamber. These conical shaped pores provide for the passage of fluid into the central combustion chamber while reducing backflow of any fluid or reaction products into the interior annular space or depositing on the interior surface of the central combustion chamber.

The separation between the outer exterior wall and the interior porous wall provides for an interior space that is sufficient to distribute a gas, preferably under pressure, over essentially the entire exposed interior porous wall. In the alternative the interior porous wall may comprise a multiplicity of apertures or nozzles for introducing the gas into central combustion chamber.

The fluid may be of any gas such as air and/or an inert gas that is preferably pressurized to a suitable pressure that upon ejection is sufficient to reduce deposition on the inner surface of the central combustion chamber. In operation, the pressurizable gas is at a sufficient pressure to be ejected through the interior porous wall at a velocity that is higher than the velocity of the particle or corrosive gases within the gas stream approaching the wall in the upper reaction chamber, thereby creating a zone in the combustion chamber adjacent to the interior porous wall that inhibits the movement of particles towards the interior surface of the combustion chamber. Generally, the gas may be pressurized in a range of from about 50 to about 600 psig, and more preferably from about 60 to about 100 psig, however, this is easily adjusted by one skilled in the art by determining the flow rate measurement of the gaseous stream into the combustion chamber. Thus, the velocity of the escaping gases through the interior porous wall can be adjusted to be equal to or greater than that of the any reaction products in the gaseous stream in the combustion chamber.

Preferably, the fluid ejected into the combustion chamber through passage of the interior porous wall is in a pulsing mode. Generally, the pulsing duration of the ejected fluid is from about 3 ms to about 1 s, more preferably from about 20 ms to about 100 ms.

In yet another aspect, the present invention relates to a method for controlled combustion of gaseous pollutants in a gaseous waste steam by treatment in a two-stage thermal reactor, the method comprising;

i) introducing the gaseous waste stream to an upper thermal reactor through at least one inlet end;

ii) providing at least one combustible fuel for mixing with the gaseous waste stream to form a fuel rich combustible gas stream mixture;

iii) igniting the fuel rich combustible gas stream mixture in a combustion chamber to effect formation of oxidized reaction products;

iv) injecting an additional fluid into the combustion chamber contemporaneously with the combusting of the fuel rich combustible gas stream mixture, wherein the additional fluid is injected in a pulsating mode and in a circumventive pattern within the combustion chamber thereby inhibiting deposition of the reaction products in the interior of the combustion chamber;

v) flowing the stream of reaction products into a lower reaction chamber while introducing into the stream an air-containing gas thereby providing a fuel lean mixture; and vi) flowing the stream of reaction products through a water vortex positioned near the entrance of the lower reaction chamber, wherein water falling from the water vortex inhibits deposition of the reaction products on interior surfaces of the lower reaction chamber.

Other aspects and advantages of the invention will be more fully apparent from the ensuing disclosure and appended claims

DESCRIPTION OF PREFERRED EMBODIMENT OF THE INVENTION

Figure 1:
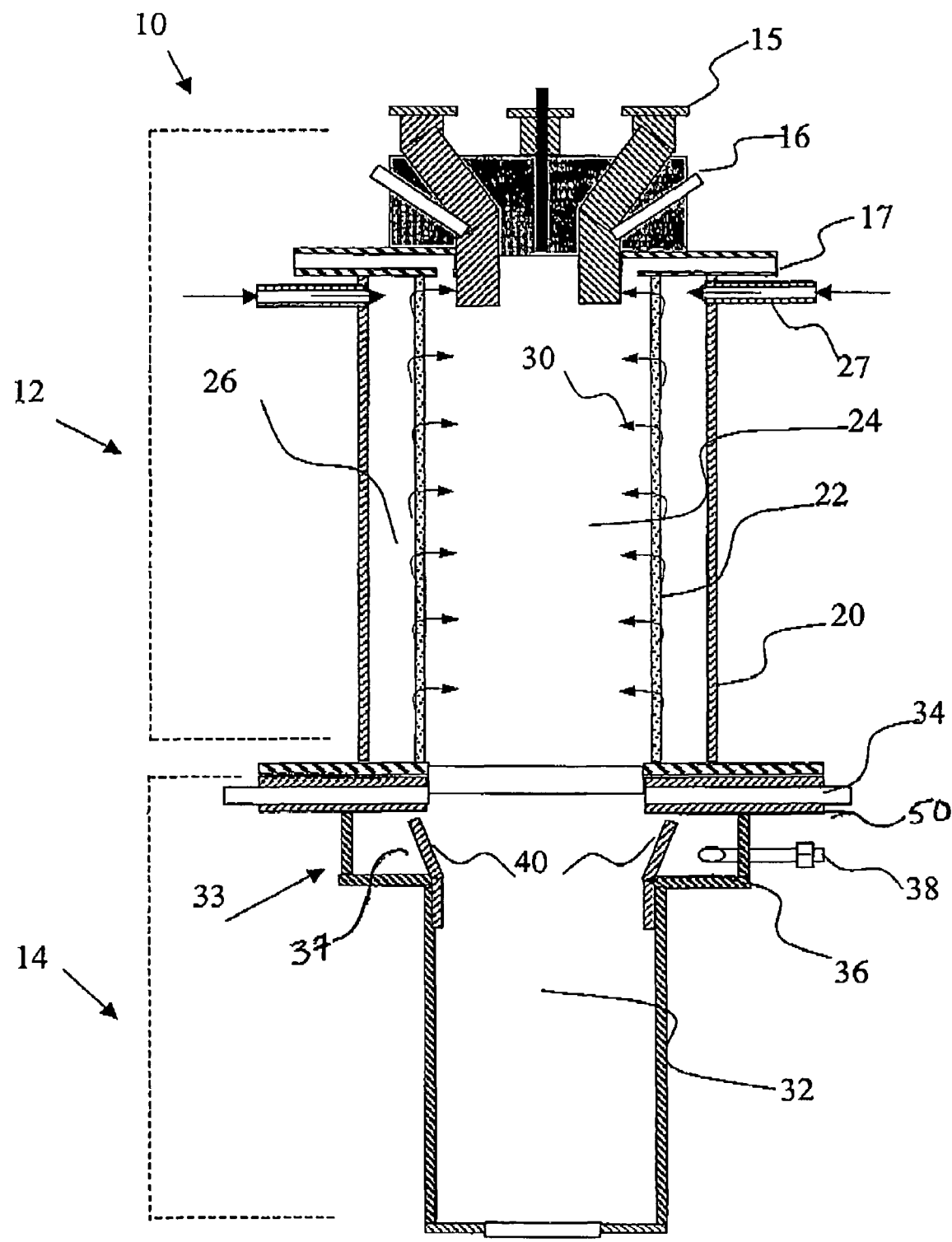
FIG. 1 is a partial cut-away view of the elevation of a two-stage thermal reactor according to the present invention.

With reference to FIG. 1, there is shown a two-stage reactor 10 representative of the system described herein. There is shown an upper reaction chamber 12 and a lower reaction chamber 14. The upper reaction chamber includes at least one waste gas inlet 15 for introducing the gaseous waste stream. In this embodiment, there are additional independent gas inlets 16 and 17 for the introduction of additional flammable gases or oxidants to provide a fuel rich gas mixture and thereby increasing the combustion temperature within the system for destruction of resistant contaminates.

The upper reaction chamber further comprises an outer exterior wall 20 made of an ordinary metallic material and an interior wall 22 made of a porous material that circumvent a central combustion chamber 24. The interior porous wall is positioned from the outer exterior wall a sufficient distance to define an interior annular space 26. The annular space 26 is provided for introducing a fluid, preferably pressurized, which enters the annular space through port 27 and exits the annular space through the interior porous wall 22 to pulse outwardly 30 through the interior porous wall and/or downwardly along the inside surface of the interior porous wall 22. The pulsing ejection of the fluid through the interior porous wall and into the central combustion chamber reduces and/or alleviates the build-up of particulate matter on the interior surface of the central combustion chamber. Preferably, the pulsing gas exits through the interior porous wall at a velocity that exceeds the velocity of any particles that may be in the gas stream within the combustion chamber and approaching the interior wall, thereby causing a non-deposition zone adjacent to the interior wall of the combustion chamber and reducing any deposition of particles on the interior surface of the combustion chamber.

The mixed gases, with any entrained particles, exit the upper thermal chamber and flow into the lower reaction chamber 14 which comprises a gas flow chamber 32, at least one inlet 34 for introduction of an oxidant, preferably, in an amount sufficient to transform the gas stream from the central combustion chamber from a fuel rich to a fuel lean mixture. The lower reaction chamber further includes a liquid vortex 33, wherein liquid enters tangentially into outer concentric chamber 36 through inlet 38 to create a swirling motion, causing the liquid to rise and overflow baffle 40 into the gas flow chamber 32 to maintain a continuous liquid film on the inner surface of the gas flow chamber, thereby reducing deposition on the interior surfaces of the baffle 40 and gas flow chamber 32.

Figure 2:
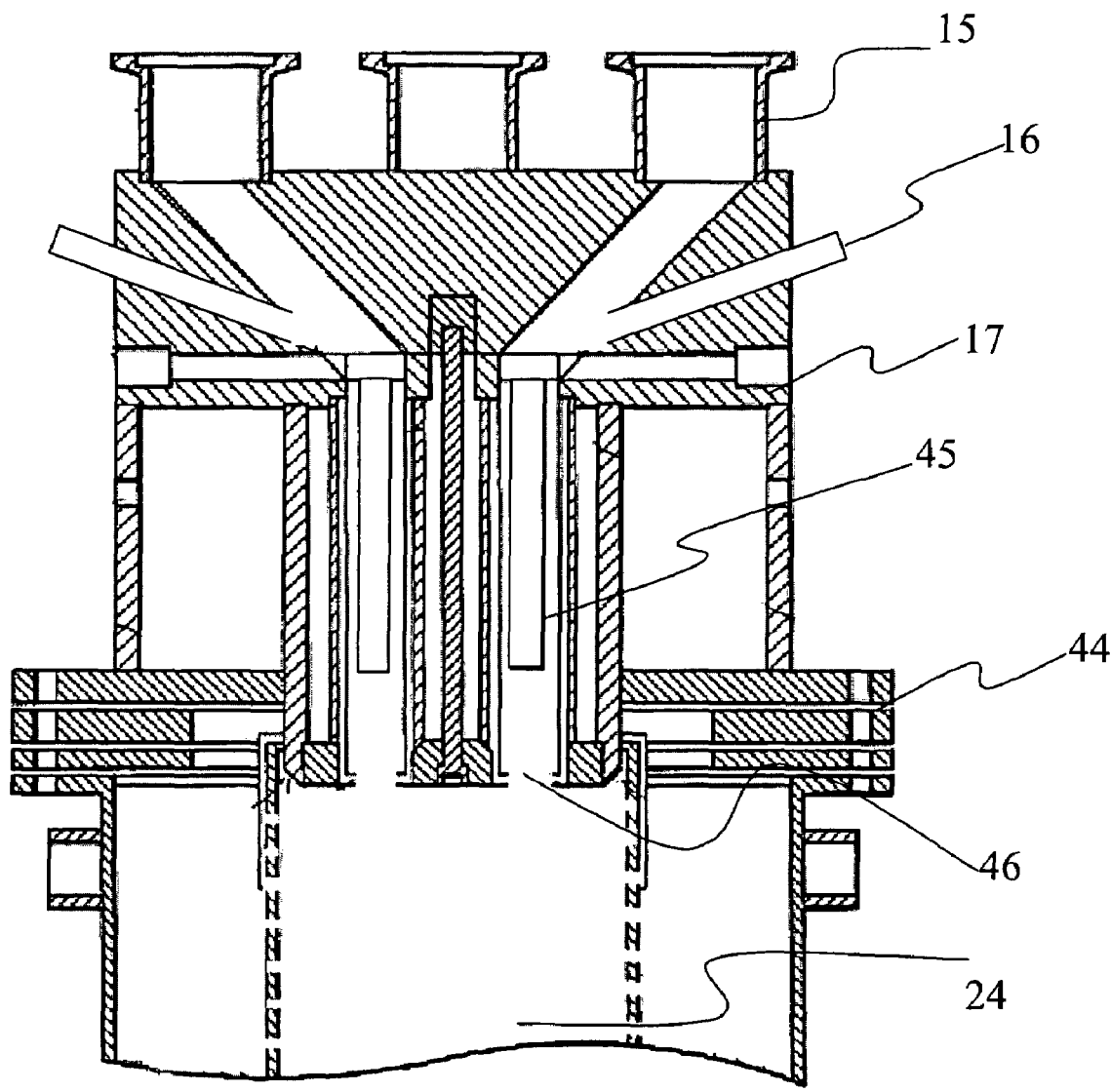
FIG. 2 is a partial cut-away view of an intake nozzle with an integrated burner according to the invention for introducing a gaseous waste stream from a processing facility into the thermal reactor.

FIG. 2 shows waste gas inlets 15 for introducing a gaseous waste stream for processing in the two-stage thermal reaction system. In this embodiment, there are multiple independent gas inlets 16 and 17 for introduction of a fuel gas and/or oxidant for mixing with the gaseous waste stream to provide a fuel rich mixture to increase the combustion temperature. The waste gas inlet tube 15 continues past the reactor wall 44 of the central combustion chamber terminating with an extension 45. The mixed gases exit the extension 45, however not directly into the central reaction chamber 24, but instead into a concentric tube 46 for thermal combustion and/or oxidation therein. Preferably, combustion in the tube 46 is facilitated by a pilot burner of the conventional type, positioned within tube 46 or near the downstream end of same and utilizing a sparking plug or hot surface for ignition. A mixed stream of a fuel and a combustion assisting gas, e.g., a propane, methane or hydrogen gas and air, can be supplied through passages 16 and/or 17 and combined with the gaseous waste stream injected into inlet 15.

In the alternative, an electrically heated unit, heated in any suitable manner, such as by electrical resistance heating, infrared radiation, microwave radiation, convective heat transfer or solid conduction may be used in the present invention. The temperature of the mixture of gases and gas flow are selected such that the flame can be produced within the concentric tube 46, 24 or both.

Inlet 16 can be utilized for introducing air between the waste inlet tubes and the reaction chamber for mixing with the gaseous waste stream. Inlet 17 is provided for introducing oxygen or natural gas as a flammable fuel for increasing the combustion temperature to a sufficient reactive temperature for remediation of the gaseous waste stream. The separate inlets permit control of oxidation, reduces the probability of incompatible gas stream mixing and permit active inlet pressure control independent of these parameters being utilized at adjacent inlets.

Figure 3:
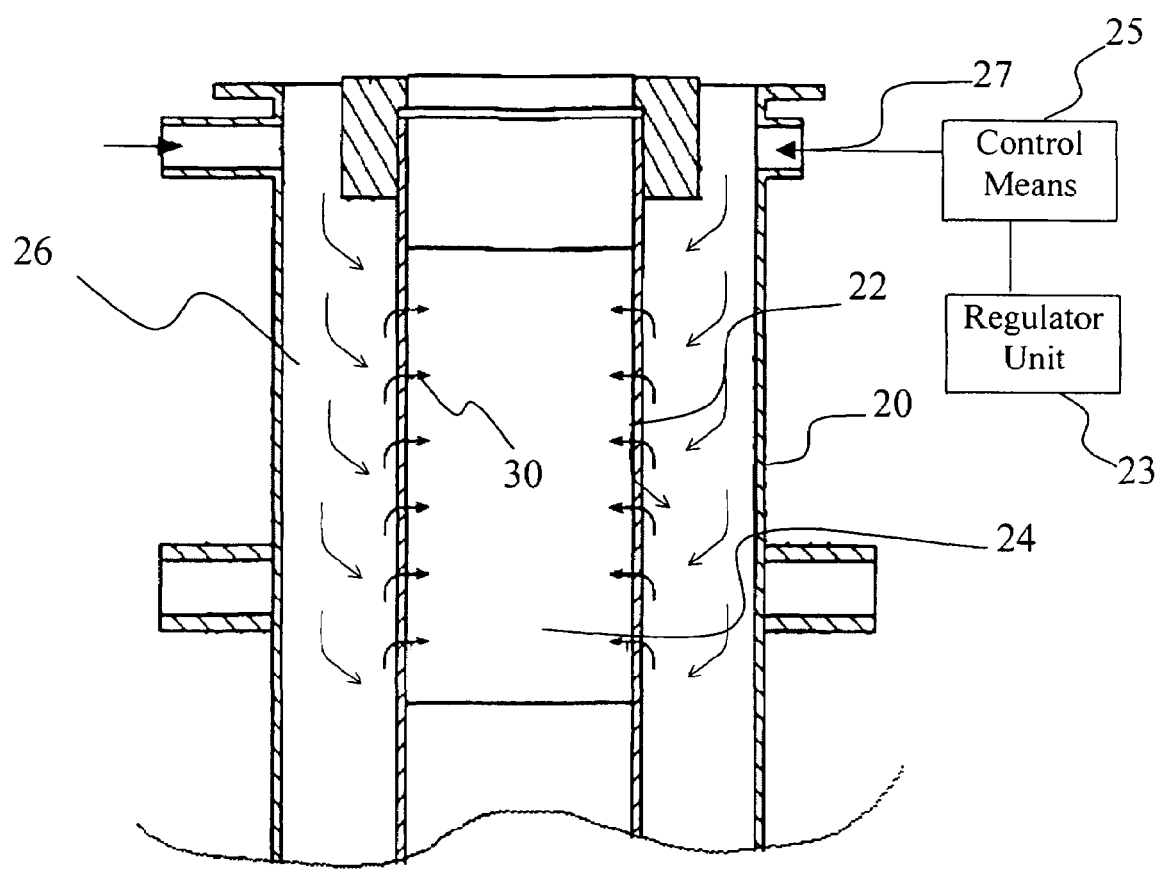
FIG. 3 is a partial cut-away view of an upper thermal reaction chamber illustrating transference of a fluid from the interior annular space into the central combustion chamber.

Referring to FIG. 3, there is shown an upper thermal reaction chamber according to the present invention. The exterior outer wall 20 may be any material so long as it has a predetermined heat resistance and strength and it can be joined securely at junctions by welding, flange coupling, etc. The interior porous wall 22 may include any porous material as long as it satisfies the heat resistance and strength requirements and may include sintered ceramics or sintered metals or the like having sufficient porosity for transference of fluids from the annular space to the central combustion chamber. Sintered ceramics may include, but are not limited to $MgAl_2O_4$, $Al_2O_3$ or SiC wherein the porous material has a porosity from about 30% to about 80% and a pore size radius ranging from about 15 nm to about 2 um.

A gaseous waste stream enters through inlets 15 (not shown) at the top of the reactor and after combustion in tube 46 (not shown) enters into the central combustion chamber 24. Additional gases or fluids are introduced, under pulsing conditions, into the central combustion chamber 24 as indicated by arrows 30 through interior porous wall 22. The gas or fluid is introduced through inlet 27 into an annular space 26 formed between the outer exterior wall 20 and the interior porous wall 22. The fluid retained in the annular space moves or diffuses through the interior porous wall 22 into the central combustion chamber at a sufficient velocity and/or pressure to cause a non-deposition zone adjacent to the interior surface of the central combustion thereby reducing deposition of unwanted reaction products on the inner surface of the central combustion chamber.

Preferably, the pulsing gas or fluid is pressurized and pulsed through the interior wall 22 or along the wall in a periodic way, such that particulate does not excessively build up or agglomerate into large and difficult to remove deposits. The pulsation magnitude and period depends on the type and quantity of the particulate forming material, the temperature of the reactor and can easily be determined by one skilled in the art.

The fluid inlet 27, which is positioned on the outer exterior wall 20, provides for the pressurized fluid such as compressed air to be supplied into annular space 26. In the alternative, a plurality of inlets may be used along the length of the outer exterior wall for even distribution and introduction of the pressurized fluid into the annular space.

The pressurized fluid may include any gas such as air and an inert gas, which is compressed to a suitable pressure, such that the gas can pass through the pores of the interior porous wall 22 to reduce and/or remove unwanted reaction products while not affecting the combustion treatment in the central combustion chamber.

The pressurized fluid may include an oxidant such as clean dry air (CDA) that may be joined in supply relationship to inlet 27 and the thus-introduced air flows into the annular space between outer wall 20 and interior porous wall 22. Alternatively, the air may be heated to a suitable temperature and then flowed through orifices or pores in the interior porous wall 22. In such a way, the oxidant may be added to mix with the effluent gas and form an oxidizable effluent gas mixture for thermal oxidation in the reactor.

The fluid is preferably ejected into the combustion chamber in a pulsating mode. Any device capable of introducing a fluid in a pulsing mode having a pulsating duration of from about 3 ms to about 1 s may be used in the present invention.

The pulsating condition is supplied in the form of successive pulse trains wherein the gas quantity in each pulse train is controlled in accordance with the time interval of each pulsation duration. The time interval between pulse trains can be regulated in such a manner that results in a specifiable average flow of the gas. The total flow of the gas to the interior space is regulated by adjusting the time interval between the various pulse trains. A regulating unit 23, as shown in FIG. 3, which preferably is a microprocessor, is in communication with a control means 25, for example a valve, for adjusting the gas flow in this manner. A flow meter may also be included to generate and transmit a signal to the regulating unit 23 and this flow signal can function as a feedback signal for regulating the volume in each gas pulse. Each gas pulse is initiated by virtue of the fact that the control means (valve) 25 is opened in accordance with an input program in the microprocessor-regulated unit 23, and each gas pulse can be shut-off or terminated when the signal from a flow meter indicates that a desired volume has passed through the flow meter. An operator may adjust the pulse duration in the regulating unit according to the different properties of the incoming gas, such as viscosity, temperature, or pressure.

In another preferred embodiment, particle deposition can be mitigated by introducing water into the annular space 26 for pulsing through the interior porous wall 22 or along the walls. In the case of steam flow through the interior porous wall, demineralized water may be contacted against the back of the interior porous wall in the annular space 26 and drawn into and through the porous material by capillary action. The water migrates towards the hot inner surface, receiving heat from the hot reactor gases, via heat conduction in the wall material. As the heat increases and the water migrates nearer to the hot inner surface of the combustion chamber, the water is converted to steam within the porous material and near the inner surface of the combustion chamber, which as a result of the high volume of vapor, is then ejected from the inner wall with sufficient force to remove adhering particulate deposits. The water and steam flow can into the annular space may be periodic or continuous. Continuous introduction of water into the annular space provides for the interior porous wall 22 to be immersed in water thereby exposing the entire surface of the porous wall to the effects of the capillary phenomenon and provide for replenishing water that has been evaporated from the surface of the porous wall 22.

In the case of periodic flow, the change in thermal conditions can promote differential thermal expansion forces, thereby aiding in the cracking and removal of strongly adhering particulates. Because of capillary forces in the wall material, a considerable particle removal force, or pressure can be achieved, even if the water source pressure is low.

For the case of steam flow along the walls, demineralized water is converted into steam, via heat and the stream is distributed through either stationary of movable nozzles, to remove particulate adhering to the wall surface. By pulsating the nozzles, thermal differential expansion effects can assist to break and remove wall deposits.

The interior porous wall 22 may be of suitable porous construction, and may for example comprise a porous sintered metal, perforated metal sheet, porous plastic, or porous ceramic wall. Preferably, the porous material provides for pores of sufficient size for transference of a fluid therethrough and that may, for example, be in the range of from about 0.5 micron to about 30 microns.

With reference to FIG. 1, the reacted gases exit the upper reaction chamber at the bottom of the chamber through a vortex of cooling water. The water vortex unit generally comprises a top plate 50, an outer shell 36 and a generally cone-shaped baffle 40. The outer shell 36 comprises a liquid inlet 38. The liquid inlet 38 is arranged in relation to the outer shell 36 such that as liquid is introduced tangentially into the outer shell 36, the concentric chamber 37 is filled with liquid to create a swirling motion, causing the liquid to rise and overflow the cone-shaped baffle to form a laminar sheet of fluid on the inner surface of the baffle that flows downwardly onto the interior surface of the gas stream flow chamber 39, thereby cooling the interior surface and reducing deposition of particulates thereon.

Although the invention has been variously described herein with reference to illustrative embodiments and features, it will be appreciated that the embodiments and features described herein above are not intended to limit the invention, and that other variations, modifications and other embodiments will readily suggest themselves to those of ordinary skill in the art, based on the disclosure herein. The invention therefore is to be broadly construed, consistent with the claims hereafter set forth.

That which is claimed is:

1. An apparatus for use during the abatement of a semiconductor manufacturing process comprising:
   an upper reaction chamber having:
      an interior porous wall that defines a central chamber;
      an outer wall that surrounds the interior porous wall and that defines an interior space between the outer wall and the interior porous wall;
      at least one waste gas inlet in fluid communication with the central chamber and adapted to introduce a gaseous waste stream to the central chamber;
      at least one fuel inlet adapted to introduce a fuel into the central chamber, where the fuel inlet is positioned to introduce fuel through a path that does not pass through pores of the porous wall;
      at least one oxidant inlet adapted to introduce an oxidant into the central chamber, where the oxidant inlet is positioned to introduce oxidant through a path that does not pass through pores of the porous wall;

a thermal mechanism positioned within the central chamber and adapted to form reaction products from the gaseous waste stream within the central chamber;

a fluid delivery system adapted to provide a fluid to the central chamber through the interior porous wall at a sufficient force to reduce deposition of reaction products on an inner surface of the interior porous wall of the central chamber; and a lower reaction chamber coupled to the upper reaction chamber and having:

a gas flow chamber in fluid communication with the central chamber, the gas flow chamber having an inlet and outlet for passing the gaseous waste stream and reaction products through the gas flow chamber;

a water delivery system adapted to generate a flowing liquid film on an interior surface of the gas flow chamber so as to reduce deposition and accumulation of particulate solids on the interior surface of the gas flow chamber; and at least one inlet adapted to introduce an oxidant to the gaseous waste stream.

2. The apparatus according to claim 1, wherein the interior space positioned between the outer exterior wall and the interior porous wall is an interior annular space.

3. The apparatus according to claim 2, wherein the means for introducing a fluid into the interior space is adapted to introduce pressurized fluid into the interior annular space.

4. The apparatus according to claim 2, wherein the means for introducing a fluid into the interior space is adapted to introduce fluid that is compressed to a suitable pressure to facilitate pulsating ejection of the fluid with a force sufficient to reduce particle deposition on the inner surface of the central chamber.

5. The apparatus according to claim 4, wherein the pressure is about 100 psig or less.

6. The apparatus according to claim 1, wherein the means for introducing a fluid into the interior space is adapted to introduce fluid selected from the group consisting of water, steam, an inert gas, a heated gas, air, clean dry air, and clean enriched air.

7. The apparatus according to claim 6, wherein the means for introducing a fluid into the interior space is adapted to introduce water.

8. The two-stage reactor according to claim 1, wherein the means for introducing a fluid into the interior space is adapted to introduce fluid into the interior space under pulsing conditions.

9. The apparatus according to claim 8, wherein the means for introducing a fluid into the interior space is adapted to inject fluid into the central chamber under periodic pulsing.

10. The apparatus according to claim 8, wherein the means for introducing a fluid into the interior space is adapted to introduce fluid into the interior space under pulsing conditions using a pulsation duration of from about 3 msec to 1 sec.

11. The apparatus according to claim 1, wherein the lower reaction chamber includes at least one oxidant inlet positioned to introduce an oxidant to the gas flow chamber.

12. The apparatus according to claim 1, further comprising a combustible fuel supply coupled to the fuel inlet, wherein the combustible fuel supply is adapted to supply, propane, natural gas, methane or hydrogen.

13. The apparatus according to claim 1, wherein the means for introducing a fluid into the interior space comprises a liquid vortex positioned near the inlet of the gas flow chamber.

14. The apparatus according to claim 13, wherein the liquid vortex comprises:

an outer shell having a top plate, a central opening in fluid communication with the central chamber;

a conical-shaped baffle within the outer shell having an inner surface and a central opening which is generally aligned with the interior surface of the gas stream flow chamber, the conical-shaped baffle generally concentrically aligned with the inner surface of the outer shell to form a concentric chamber; and a liquid inlet arranged to tangentially introduce liquid into the concentric chamber, thereby filling the concentric chamber with liquid to create a swirling motion, causing the liquid to rise and overflow the conical-shaped baffle to form a sheet of fluid on the inner surface of the conical-shaped baffle that flows downwardly onto the interior surface of the gas stream flow chamber.

15. The apparatus according to claim 14, wherein the sheet of fluid on the inner surface of the conical-shaped baffle inhibits contact of an entering gas stream with the interior surface of the gas stream flow chamber thereby resisting deposition of reaction products thereon.

16. The apparatus according to claim 1, wherein the interior porous wall is fabricated of a material comprising ceramic, sintered ceramic, sintered metal, porous plastic, porous metal material or a porous polymeric material.

17. The apparatus according to claim 16, wherein the interior porous wall comprises pores uniformly distributed in the porous material.

18. The apparatus according to claim 1, wherein the outer exterior wall and the interior porous wall are separated a sufficient distance to provide an annular space and for distributing a pressured gas for passage through the interior porous wall.

19. The apparatus according to claim 18, wherein the interior porous wall comprises a plurality of apertures for passage of a pressurized gas through the interior porous wall into the central chamber.

20. The apparatus according to claim 19, wherein the plurality of apertures comprises conical shaped protuberances.

21. An abatement system for treating gaseous pollutants in a gaseous waste stream, the system comprising:

an upper thermal reaction chamber comprising:

an outer exterior wall;

an interior porous wall, wherein the interior porous wall defines a central chamber and wherein the interior porous wall is positioned from the outer exterior wall a sufficient distance to define an interior annular space;

means for introducing a fluid to the interior annular space;

thermal means for forming reaction products from the gaseous waste stream;

at least one waste gas inlet for conducting the gaseous waste stream into the upper thermal reactor;

at least one fuel inlet adapted to introduce a fuel into the central chamber, where the fuel inlet is positioned to introduce fuel through a path that does not pass through pores of the porous wall; and at least one oxidant inlet adapted to introduce an oxidant into the central chamber, where the oxidant inlet is positioned to introduce oxidant through a path that does not pass through pores of the porous wall; and a lower reaction chamber comprising:

a gas flow chamber in fluid communication with the central chamber; and least one oxidant inlet positioned to introduce an oxidant to the gas stream flow chamber;

wherein the lower reaction chamber includes a liquid vortex positioned between the central chamber and the gas flow chamber, wherein the liquid vortex comprises:

an outer shell having a top plate, a central opening in fluid communication with the central chamber;

a conical-shaped baffle within the outer shell having an inner surface and a central opening which is generally aligned with the interior surface of the gas stream flow chamber, the conical-shaped baffle generally concentrically aligned with the inner surface of the outer shell to form a concentric chamber; and a liquid inlet arranged to tangentially introduce liquid into the concentric chamber, thereby filling the concentric chamber with liquid to create a swirling motion, causing the liquid to rise and overflow the conical-shaped baffle into the gas stream flow chamber to form a sheet of fluid on the inner surface of the conical-shaped baffle that flows downwardly onto the interior surface of the gas stream flow chamber.

22. The abatement system according to claim 21, wherein the at least one waste gas inlet comprises a conduit terminating with a portion of the conduit within the central chamber wherein the portion of the conduit is located within a tube which projects beyond the end of the conduit to define a chamber within the tube for flame formation, the tube having an open end communicating with the central chamber.

23. The abatement system according to claim 21, wherein the interior porous wall provides for transference of the fluid from the interior annular space into the central chamber at a sufficient force to reduce deposition of reaction products on the interior porous wall.

24. The abatement system according to claim 23, wherein the means for introducing a fluid to the interior annular space is adapted to inject steam through the interior porous wall.

25. The abatement system according to claim 23, wherein the means for introducing a fluid to the interior annular space is adapted to introduce fluid under pulsing conditions.

26. The abatement system according to claim 21, wherein the interior porous wall comprises a porosity of about 80% or less.

27. The abatement system according to claim 21, wherein the means for introducing a fluid to the interior annular space is adapted to introduce pressurized fluid into the annular space.

28. The abatement system according to claim 21, wherein the means for introducing a fluid to the interior annular space is adapted to introduce fluid selected from the group consisting of water, air, clean dry air, and clean enriched air.

29. The abatement system according to claim 21, wherein the means for introducing a fluid to the interior annular space is adapted to introduce water.

30. The abatement system according to claim 21, further comprising a combustible fuel supply coupled to the at least one fuel inlet, wherein the combustible fuel supply is adapted to supply, propane, natural gas, methane or hydrogen.

* * * * *